Patented Oct. 7, 1924.

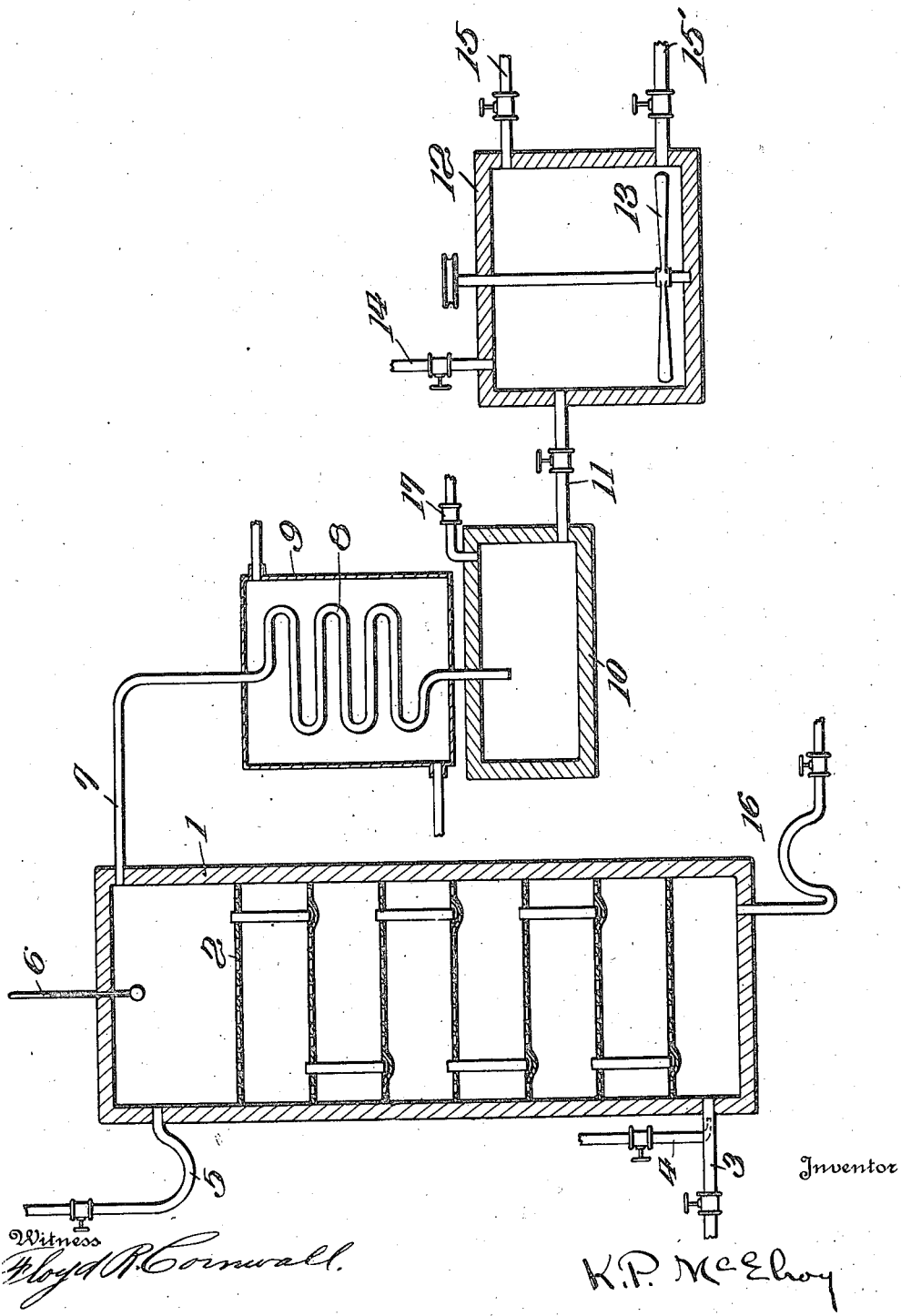

1,510,790

UNITED STATES PATENT OFFICE.

KARL P. McELROY, OF WASHINGTON, DISTRICT OF COLUMBIA, ASSIGNOR, BY MESNE ASSIGNMENTS, TO CARBIDE AND CARBON CHEMICALS CORPORATION, A CORPORATION OF NEW YORK.

MANUFACTURE OF CHLORHYDRINS.

Application filed March 28, 1918. Serial No. 225,252.

*To all whom it may concern:*

Be it known that I, KARL P. MCELROY, a citizen of the United States, residing at Washington, in the District of Columbia, have invented certain new and useful Improvements in Manufacture of Chlorhydrins, of which the following is a specification.

This invention relates to the manufacture of chlorhydrins; and it comprises a method of producing chlorhydrins wherein a gaseous olefin, such as ethylene, propylene or the butylenes, or a gaseous mixture comprising one or more olefins, such as oil gas, pyrolyzed alcohol vapors, etc., is caused to react, advantageously under a pressure greater than atmospheric, with an aqueous solution of hypochlorous acid free, or substantially free, of heavy metal compounds or catalysts; all as more fully hereinafter set forth and as claimed.

The chlorhydrins corresponding to the gaseous olefins are bodies which differ, empirically speaking, from the olefins by the presence of the elements of hypochlorous acid (H, Cl and O); ethylene, for example, being $C_2H_4$ and ethylene chlorhydrin being $C_2H_4OHCl$. Chlorhydrins can be made from these gaseous olefins by exposing an atmosphere of the gas to a liquid material containing hypochlorous acid and various mercury compounds, soluble and insoluble, known as the Carius reagent. This reagent is made by passing chlorin into water containing an excess of mercuric oxid in suspension, a number of precautions, such as that of previously heating the oxid to 300° C., being strictly observed. The action of this reagent on the olefin however is slow and the yield of chlorhydrin is poor. The product is by no means pure.

The exact nature of the actions taking place is not known; but of course the first thing that must occur is a solution of the olefinic gas in the liquid. These olefins are, however, but little soluble in aqueous liquids; pure water taking up, for example, only about an eighth its volume of ethylene while propylene and the butylenes are even less soluble. The presence of any salts, other than mercury compounds, further lessens the solubility; ethylene being, for instance, practically insoluble in a solution of common salt of no great strength. The olefins however combine with mercury salts; mercuric chlorid for example reacting with ethylene to form a complex compound with liberation of hydrochloric acid. The reaction is a reversible one, hydrochloric acid when present in substantial amounts breaking up the new compound with reliberation of ethylene. In the Carius reagent, an excess of mercuric oxid and insoluble mercuric oxychlorid are however always present to take up hydrochloric acid as fast as it forms producing more mercuric chlorid to unite with and dissolve more ethylene. Because of this action, in using the Carius reagent a stronger solution of ethylene is obtained than could be obtained with pure water; but it is a solution of ethylene compounds rather than of ethylene itself. Carius (Liebig's Annalen 1863, 126, p. 195) and subsequent investigators however found that successful production of chlorhydrins depends upon quite exact following of certain directions in the manufacture of the reagent. Small differences in the manner of preparation make great differences in the purity and amount of chlorhydrin produced. The method has never been used for technical purposes because of its expense and of the small yields of impure products obtained. It has however been occasionally used in laboratory investigations.

I have found that I can obtain better yields and purer products by the use of a pure solution of hypochlorous acid; a solution free from heavy metal compounds, including mercury compounds. Hypochlorous acid although reputed a very unstable compound is, as I have found, not so unstable as to preclude its use if the solution be pure. It is necessary that the solution be free of catalytic materials and in particular of heavy metals or their compounds. The presence of iron or copper as metals or as salts, for example, causes a decomposition of hypochlorous acid into HCl and oxygen, while the HCl in turn reacts with HClO to form chlorin. Hypochlorites, that is, combinations of HClO with bases, must also be absent since with any material concentration of HClO, they react to form chlorates with a rapidity depending upon the concentration of the HClO. Chlorides in and of themselves are not particularly detrimental to HClO if there be no other acid than HClO present; but their presence in solutions used in making chlorhydrins from the gaseous olefins is not desirable for the reason that they cut down the solubility of the olefin in the liquid and to that extent slow down the action. As stated, the first action must always be the solution of the gas in the liquid so that it may come into the sphere of action of the HClO. However, this lessening in solubility by the presence of chlorids and other salts may be countervailed by working at low temperatures (which is also desirable for other reasons) and by using pressure.

In the present invention I find most advantageous the use of a distilled solution of hypochlorous acid substantially free from other bodies, which may be obtained by passing chlorin upward through a structure of the general type of a column still and made of acid resisting material. The temperature of the still at the point of exit is kept between 95° and 100° C. while hot water is kept flowing down through the still. Under these conditions, the chlorin reacts with the hot water in a well understood way to form HCl and HClO, the latter volatilizing and the former remaining in solution. The volatilized HClO passes forward out of the still together with water vapor and is condensed by any suitable means to form a solution of the acid. Cooling should be as quick as possible. This solution should be kept in the dark and under circumstances precluding the possibility of access of iron or copper compounds. So made and so preserved it reacts readily with ethylene, propylene and the butylenes. In practice I ordinarily chill the HClO solution and agitate the gas and the liquid together or film out the liquid in some manner so as to expose an extensive surface to the gas, as by passing the gas upward through a still-like structure against a descending current of the pure acid. I also ordinarily use pressure; a pressure of, say, 75 to 90 pounds per square inch being highly advantageous.

Instead of using water only in the apparatus producing HClO vapors, I may of course use various salts having the power of reacting with HCl but not decomposed by HClO; as for instance neutral sodium sulfate, ordinary sodium phosphate ($HNa_2PO_4$), borax, sodium carbonate, etc. Using such salts the capacity of a given apparatus is much increased since it is not necessary to use so much water to insure removal of all the HCl. The use of sodium phophate or sodium sulfate is convenient since the liquid passing from the HClO apparatus may be evaporated and heated to expel HCl and regain the original salt.

I may make a HClO solution by passing chlorin into the solution of various light metal salts of polybasic acids, as for instance the sodium phosphate referred to. In so doing if only enough chlorin be employed to convert the $Na_2HPO_4$ into $NaH_2PO_4$ and NaCl, no HCl is liberated. These solutions if free of copper and iron and mercury salts give a clean chlorhydrin in large yield; but because of the presence of saline matter (chloride, etc.) in solution their absorbing power for the gas is lessened. This results in a slowing of the operation; but as stated this slowing action in part may be obviated by the use of pressure and cold. By distilling these solutions, solutions of HClO free of saline matter may be obtained. In distillation the HClO goes over first, so that it is possible to make strong HClO solutions from weak liquids. In another method of making HClO solutions, ordinary bleaching powder or sodium hypochlorite in ice cold water may be cautiously treated with the exact amount of strong acid (sulfuric, nitric or hydrochloric) needed to set free all hypochlorous acid. More acid will set free HCl and form chlorin; less acid will leave hypochlorites present and result in a quick formation of chlorate with loss of much of the HClO. Instead of using an acid, chlorin itself may be passed into an ice cold solution of a hypochlorite. The solution of HClO so formed may be distilled. I find it better, for the reasons stated, to use these distilled HClO solutions, rather than the original liquids containing various salts in addition to the HClO.

After the action of the olefin on the HClO solution is complete, the solution of chlorhydrin formed may be distilled to regain the chlorhydrin. These chlorhydrins though boiling in a dry condition at a temperature considerably above the boiling point of water, in admixture with water form a low boiling mixture which enables a convenient concentration.

While I have hereinbefore spoken more particularly of the use of pure ethylene, propylene and the butylenes, I wish it to be understood that the present process is also applicable to mixtures of these olefins such as may be obtained by cracking oil, such as petroleum oils of various kinds, to form oil gas. The use of these mixtures is advantageous in a number of respects aside from their cheapness. A mixture of ethylene chlorhydrin and propylene chlorhydrin, such as can be formed by treating oil gas in the manner described is easier to recover from water than either chlorhydrin per se. The impure mixtures of gases containing ethylene made by passing alcohol or the like over hot catalysts, such as silicate of alumina are also applicable. A good gas for the present purposes may be made by passing a petroleum oil, such as crude oil, gas oil, kerosene, gasoline, solar oil, etc. through a tube, retort or other zone heated to about 700° C. Or a refractory checkerwork may be heated up to the right temperature and then oil vapors passed through it. The gas obtained may be scrubbed and purified in various ways. If it is to be used under pressure in making chlorhydrin, compressing in the presence of a little heavy oil offers a convenient method of removing various impurities. But these impurities may be left in the gas and unpurified gas employed. Ethylene, propylene and the butylenes may of course be separately isolated from this gas mixture by refrigeration and fractional condensation.

In the accompanying illustration, I have shown, more or less diagrammatically, one form of apparatus of the many suitable for the present purpose. In this view which is a vertical section, element 1 is a still body provided internally with the usual perforated cross plates 2, here shown as having the cup and tube liquid feed. Near the bottom chlorin is introduced by valved conduit 3 and steam injector 4. Near the top of the column is trapped feed pipe 5 through which water, a suspension of calcium carbonate or phosphate, a solution of sodium phosphate or sodium sulfate, etc., may be introduced. Thermometer 6 allows control of temperature. HClO vapors and water vapors are removed by outlet 7, continued as worm 8 in cooling tub 9. Condensed hypochlorous acid is collected in storage tank 10 whence it may be removed continuously or intermittently by valved outlet conduit 11 and transferred to a reaction chamber. The reaction chamber 12 shown is of a simple type provided with agitating propeller 13, inlet for olefinic gas 14 and outlet for waste gas 15. Chlorhydrin solution is removed at valved outlet 15'. Solutions of HCl or chlorids formed in the column are removed therefrom by trapped pipe 16. Waste gases passing the hypochlorous acid generator and storage tank for condensate may be bled off at valved outlet 17. Except where a milk of carbonate of lime is used in the column, there will ordinarily be but little uncondensable gas formed. With carbonate of lime, zinc carbonate, etc. there is of course a generation of carbon dioxid.

In chamber 12, olefinic gas may be introduced under as much pressure as may be deemed desirable. I find 75 pounds pressure convenient for working as it much hastens absorption. After the hypochlorous acid has taken up the olefin to the extent desired, the solution may be fractionally distilled to regain chlorhydrins. A little zinc oxid, borax, carbonate of soda, carbonate of lime or other body capable of taking up HCl but indifferent to HClO may be added to the HClO solution if any chlorin or hydrochloric acid should chance to pass over with the HClO.

What I claim is:—

1. The process of making chlorhydrins which comprises preparing a solution of hypochlorous acid under conditions excluding the presence of substances detrimental to the chlorhydrin-forming reaction, and exposing the solution to the action of a gaseous olefin.

2. The process of making chlorhydrins which comprises treating a solution of hypochlorous acid with a gaseous olefin in the absence of soluble compounds of heavy metals.

3. The process of making chlorhydrins which comprises treating a solution of hypochlorous acid with a gaseous olefin in the absence of soluble compounds of heavy metals and in the absence of soluble metal chlorids.

4. The process of making chlorhydrins which comprises treating an aqueous liquid with chlorin at a temperature sufficient to permit vaporization of water vapor and HClO, condensing the water vapor and HClO and treating the solution so formed with an olefinic gas.

5. The process of making chlorhydrins which comprises producing HClO in the presence of water, distilling off the HClO and some of the water, condensing the distilled vapors to form a solution of HClO and treating such solution with an olefinic gas.

6. The process of making chlorhydrins which comprises producing HClO in the presence of water, distilling off the HClO and some of the water, condensing the distilled vapors to form a solution of HClO and treating such solution with an olefinic gas under pressure.

In testimony whereof, I affix my signature hereto.

K. P. McELROY.